US007536361B2

(12) United States Patent
Alberti et al.

(10) Patent No.: US 7,536,361 B2
(45) Date of Patent: May 19, 2009

(54) WEB-BASED SOLUTION FOR MANAGING INFORMATION TRADITIONALLY MANAGED WITHIN PRIVATE ELECTRONIC ENVIRONMENTS

(75) Inventors: Emilio Alberti, Monroe, CT (US); Walter Baur, Woodbury, CT (US); Roger Kerr, Germantown, MD (US)

(73) Assignee: International Business Machines Corporation, Armonk, NY (US)

( * ) Notice: Subject to any disclaimer, the term of this patent is extended or adjusted under 35 U.S.C. 154(b) by 1750 days.

(21) Appl. No.: 09/752,065

(22) Filed: Dec. 29, 2000

(65) Prior Publication Data

US 2002/0087485 A1 Jul. 4, 2002

(51) Int. Cl.
*G06F 23/20* (2006.01)

(52) U.S. Cl. .............................. 705/80; 705/1; 705/23; 705/26; 705/15

(58) Field of Classification Search .................... 705/1, 705/50, 57, 80
See application file for complete search history.

(56) References Cited

U.S. PATENT DOCUMENTS 6,061,792 A * 5/2000 Simon ........................ 713/176
6,131,087 A 10/2000 Luke et al. .................... 705/26
6,167,378 A * 12/2000 Webber, Jr. .................... 705/8

FOREIGN PATENT DOCUMENTS

| | | |
|---|---|---|
| EP | 1054333 A2 | 11/2000 |
| WO | WO 97/19415 | 5/1997 |
| WO | WO 00/33202 | 6/2000 |

OTHER PUBLICATIONS http://www.sei.cmu.edu- “Technology Descriptions”- “Three-Tier Software Architecture” and “Distributed/Collaborative Enterprise Architectures”.*

* cited by examiner

*Primary Examiner*—Andrew J. Fischer
*Assistant Examiner*—John M Winter
(74) *Attorney, Agent, or Firm*—Derek S. Jennings; David A. Pascarella, Esq.; Heslin Rothenberg Farley & Mesiti, P.C.

(57) ABSTRACT

One or more aspects of managing information that were previously performed within a private electronic environment are now performed within a public electronic environment off-line from the private environment. This allows the information to be managed at a location that is user-friendly, and relaxes the requirement for a synchronous connection to the private environment. One example of information managed in this manner is a proposal for a contract, such as sales contract.

70 Claims, 6 Drawing Sheets

WEB-BASED SOLUTION FOR MANAGING INFORMATION TRADITIONALLY MANAGED WITHIN PRIVATE ELECTRONIC ENVIRONMENTS

CROSS-REFERENCE TO RELATED APPLICATIONS

This application contains subject matter, which is related to the subject matter of the following application. The below listed application is assigned to the same assignee as this application, and is hereby incorporated herein by reference in its entirety:

"Method, System and Program Product For Synchronous Communication Between A Public Electronic Environment And A Private Electronic Environment", Mantena et al., Ser. No. 09/751,069, filed herewith.

TECHNICAL FIELD

This invention relates, in general, to managing information, and in particular, to performing one or more aspects of managing the information within a public electronic environment, rather than within a private electronic environment.

BACKGROUND ART

Today, many businesses rely on technological advances to enhance business operations. For instance, computers are integrated into many businesses in order to facilitate day-to-day operations of a business and/or to manage information relating to the business. This information can be any information associated with the business including, for instance, information relating to business dealings, such as drafting and negotiating agreements.

Oftentimes, the business information is stored on a computer internal to the business, behind one or more firewalls. In order to access the information, connection to the internal computer is needed, as well as knowledge of the particular graphical user interfaces (GUI) used to access the information. This synchronous connection to the internal computer causes delays, and the types of graphical user interfaces typically used are often limiting in their flexibility and ease of use. Further, the user is required to learn the paradigm of potentially numerous graphical user interfaces.

Thus, a need exists for a capability that facilitates managing information off-line from the internal computer. A further need exists for a capability that does not force the users to employ a specific GUI paradigm to work with information stored on the internal computer.

SUMMARY OF THE INVENTION

The shortcomings of the prior art are overcome and additional advantages are provided through the provision of a method of managing information. The method includes, for instance, identifying information to be managed; and managing the information within a public electronic environment, wherein one or more aspects of managing the information traditionally performed within a private electronic environment are performed within the public electronic environment off-line from the private electronic environment.

As one example, the information includes a proposal for a contract.

In a further aspect of the present invention, a method of managing the creation of a proposal is provided. The method includes, for instance, obtaining data for the proposal from a private electronic environment; creating the proposal at a public electronic environment disconnected from the private electronic environment, the creating using at least a portion of the obtained data; and providing the proposal to the private electronic environment.

System and computer program products corresponding to the above-summarized methods are also described and claimed herein.

Advantageously, at least one feature of the present invention enables one or more aspects of managing the information to be performed off-line from a private electronic environment, which is to ultimately receive the information. This enables the information to be worked-on in a user friendly environment, and does not require the user to stay connected to the private electronic environment.

Additional features and advantages are realized through the capabilities of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with a feature of the present invention, one or more aspects of managing information traditionally performed within a private electronic environment are now performed at a public electronic environment off-line from the private electronic environment.

For example, in accordance with a feature of the present invention, a proposal for a contract (such as a sales contract) is drafted and negotiated within the public electronic environment (e.g., at a web server) disconnected from the private electronic environment. The public electronic environment connects to the private environment when it needs data, but then negotiates and drafts the proposal off-line from the private electronic environment. Then, after the proposal is in final form, the public environment connects to the private environment (e.g., a server internal to a corporation) to register the proposal with the private electronic environment, as a contract.

Figure 1:
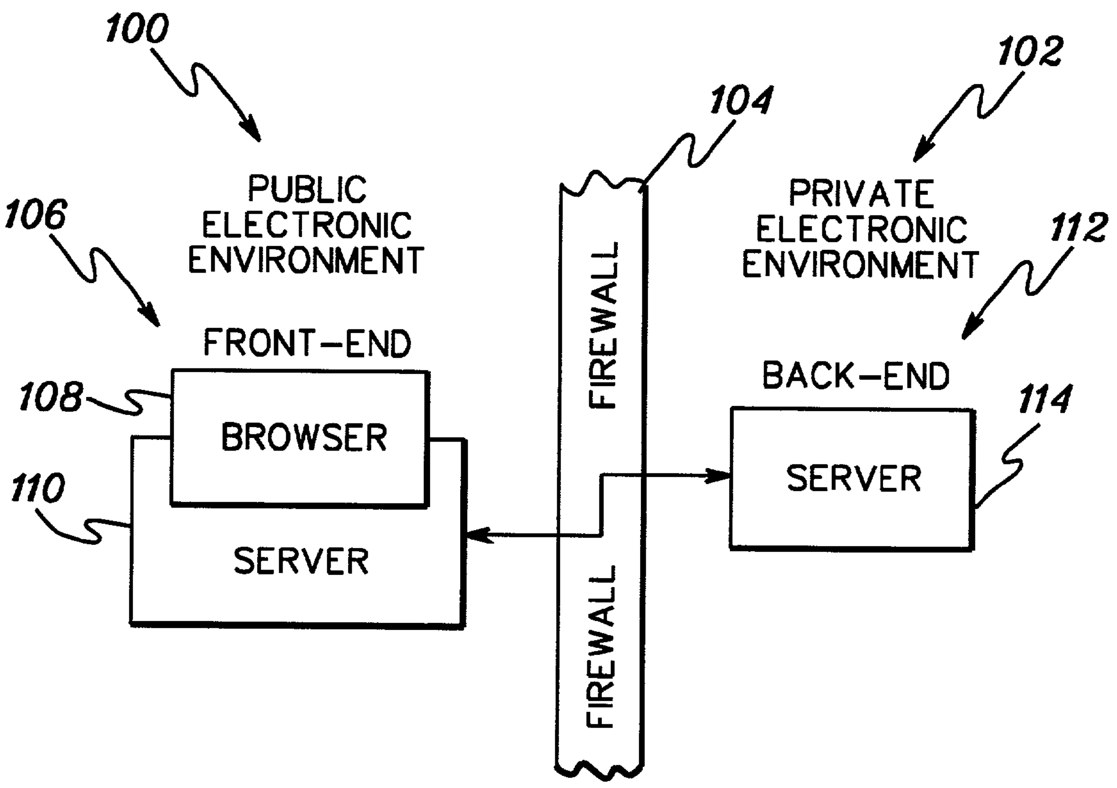
FIG. 1 depicts one example of a communications environment incorporating and using aspects of the present invention.

In one embodiment, a public electronic environment 100 (FIG. 1) is coupled to a private electronic environment 102 via one or more firewalls 104. In one example, public electronic environment 100 includes a front-end system 106 having, for instance, at least one browser 108 and at least one server 110. Private electronic environment 102 includes a back-end system 112 having, for instance, one or more servers 114. Further details regarding the front-end system and back-end system are described with reference to FIG. 2.

Figure 2:
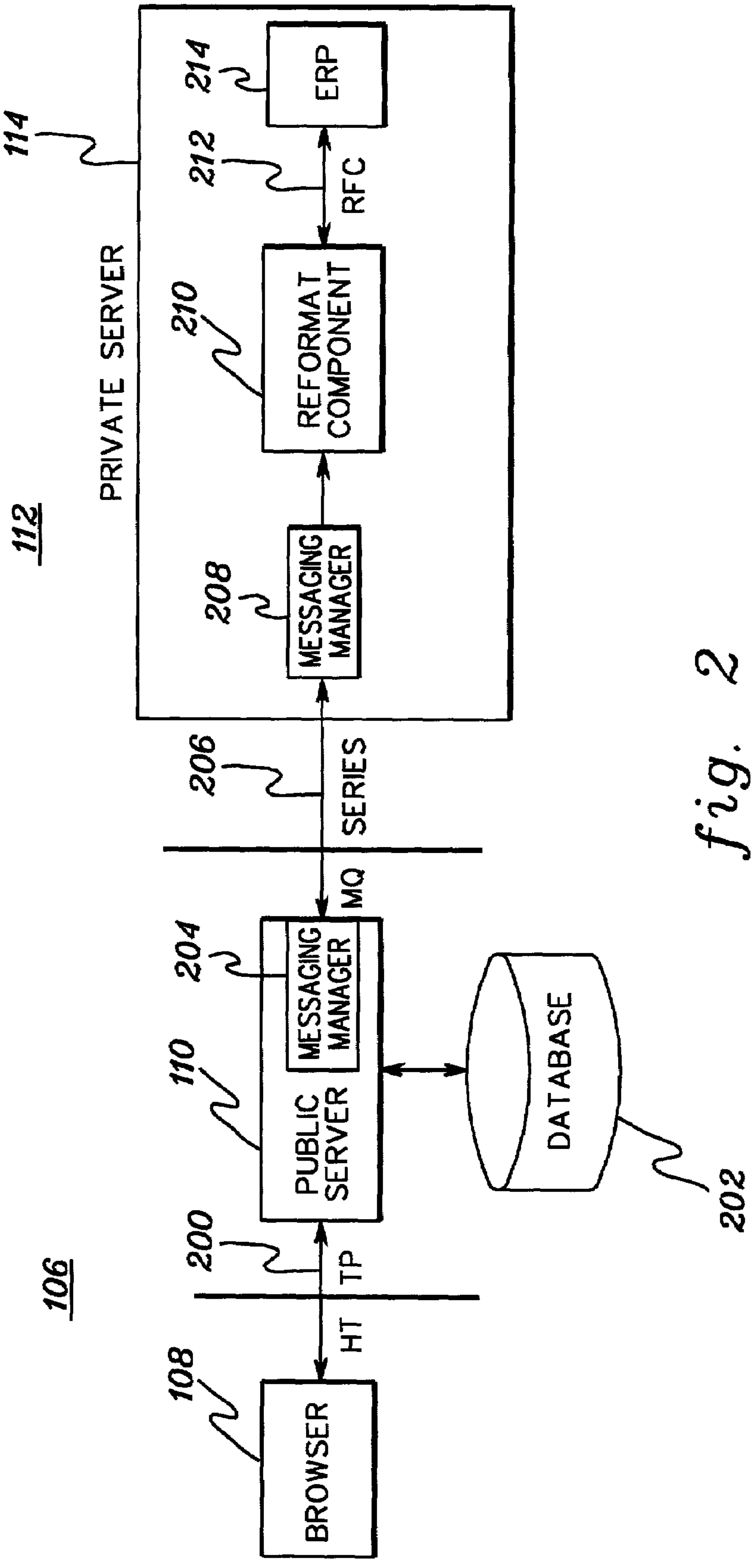
FIG. 2 depicts further details of the communications environment of FIG. 1, in accordance with an aspect of the present invention.

As depicted in FIG. 2, browser 108 of the front-end system is coupled to server 110 via a communications medium 200. In one example, the browser is a web browser, such as Netscape; the server is a web server, such as the Lotus Domino Go Web Server running on the AIX operating system (offered by International Business Machines Corporation); and the communications medium is the Hypertext Transfer Protocol (HTTP).

In this particular example, the web server is secured requiring a logon id and password to use the features of the present invention. In particular, when a user connects to the system, the user is presented with a logon screen. In response to the user logging on, a session is created on the web server. Each session is uniquely identified by a session id, and each session stores state information, if any.

Running on the web server is Net.Data (offered by International Business Machines Corporation), which is configured for FastCGI (Common Gateway Interface) invocation, and is used to access data stored on a database 202. The database is coupled to the server of the public environment (i.e., the public server), and in one example, is a DB2 database (e.g., a DB2 Universal Database (UDB), offered by International Business Machines Corporation), used for storing various data/information locally at the web server. This data/information includes, for instance, user profile data, proposals, and database connection information. For example, a configuration file is used to store database connection information, such as MQSeries queue names, as parameters, as well as any other configurable entities identified during the detail design.

The data/information is directly accessed by Net.Data macros, and output is presented to the user in the form of HTML pages, as examples. JavaScript may be used where special client-side processing is desired. Further, in one example, reports are presented in the Lotus 1-2-3 Spreadsheet format.

Also located on public server 110 is a messaging manager 204 used in communicating between public server 110 and server 114 of the private environment (i.e., the private server). In one example, the messaging manager is an MQSeries Queue Manager managing communication with the private server through a communications medium 206, such as MQSeries channels. In particular, messaging manager 204 is coupled to a messaging manager 208 of private server 114 via the communications medium. (MQSeries is a product offered by International Business Machines Corporation, and is described in an IBM publication entitled "MQSeries Application Programming Guide", Publication No. SC33-0807-12, November 2000, which is hereby incorporated herein by reference in its entirety.)

The messaging managers facilitate access to data on the private server. For example, programs on the web server make requests to the private server by writing data to a request queue associated with the messaging manager. The data is read from the request queue by a reformat component 210 of the private server. The reformat component (e.g., a program module) reformats the transactions (e.g., MQSeries transactions) into a format understood by the private server, and makes a call (e.g., a Remote Function Call (RFC), which can be called from outside the application) 212 to the appropriate module 214 (e.g., an Enterprise Resource Planning system, such as SAP) on the private server. The reformat component then writes the output from SAP to a reply queue, also associated with the messaging manager. The requesting web server program then reads the output from the reply queue.

One embodiment of the reformat component is further described in a co-filed, U.S. Patent Application entitled "Method, System and Program Product For Synchronous Communication Between A Public Electronic Environment And A Private Electronic Environment", Mantena et al., Ser. No. 09/751,069, which is hereby incorporated herein by reference in its entirety.

In accordance with a feature of the present invention, one or more aspects of managing information are performed at a front-end system rather than at a back-end system. In particular, various tasks or aspects of management that were previously performed while connected to the private server are now performed off-line from the private server. These aspects include various steps of, for instance, creating a proposal for a contract and/or maintaining the proposal.

While the embodiments described herein relate to managing a sales proposal, the invention is not limited to such an embodiment. Further, although various types and aspects of management are described; again, the invention is not limited to such types and aspects. Many other types and aspects of management, as well as other types of information traditionally performed and managed at the private server can now be performed and managed at the public server, and thus, are considered a part of the claimed invention.

Figure 3A:
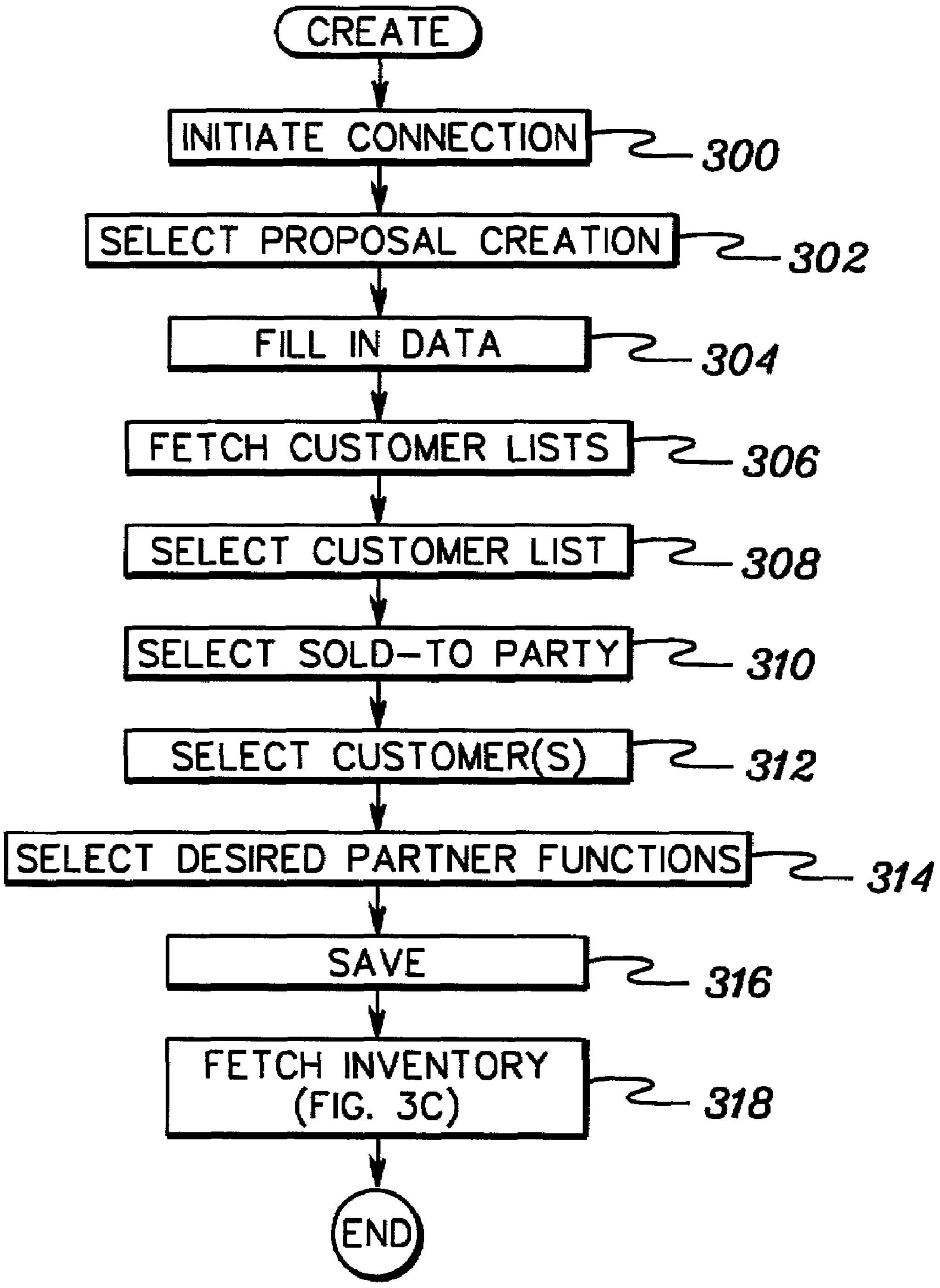
FIG. 3*a* depicts one embodiment of the logic associated with creating a proposal in a public electronic environment, in accordance with an aspect of the present invention.

One example of the logic associated with creating a proposal on a public server, using, for instance, a web portal, is described with reference to FIG. 3*a*. Initially, a user initiates a connection with the web server, STEP 300. For example, an internet browser is started and the user connects to the particular web server URL used for the present invention (referred to herein as the OPPT URL). In this example, the web server is secured, and thus, the user logs on via a particular registration procedure, which uses a user id and password to maintain security. After logging on, a main menu is displayed.

Figure 3B:
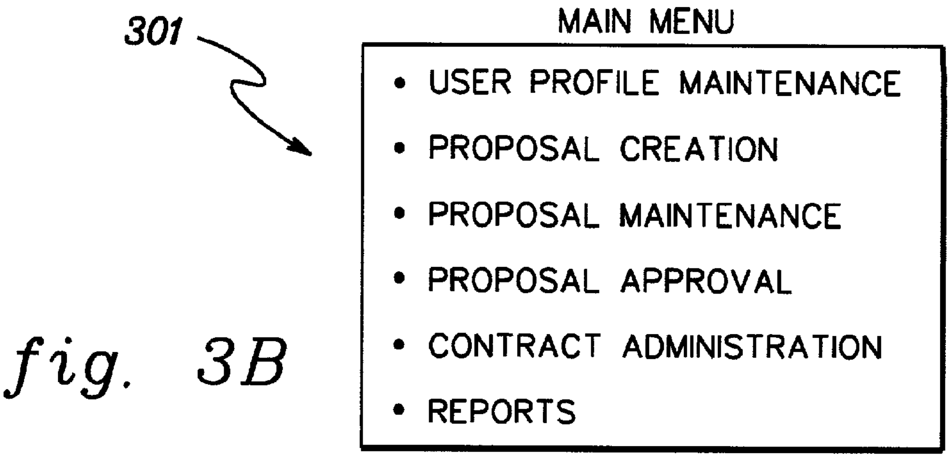
FIG. 3*b* depicts one embodiment of a main menu utilized in accordance with an aspect of the present invention.

Referring to FIG. 3*b*, a main menu 301 includes various actions that can be performed by the user. In one example, these actions are presented to the user in a tool bar, and include, for instance, user profile maintenance, proposal creation, proposal maintenance, proposal approval, contract administration and reports. Various of these actions are described in further detail herein.

Returning to FIG. 3*a*, at the main menu, the user selects "Proposal Creation," which brings up one or more additional displays, STEP 302. At these additional displays, the user enters any required or desired data for the proposal, STEP 304. This data can include, for instance, a proposal name, contract start date, contract end date, contract period beginning, contract period ending, proposal type, billing frequency, Time Value of Money (TVM) or cost of money rate (if applicable), anniversary contract amount (if applicable), variance cap amounts or percentages (if applicable), planned growth (if applicable), maximum limit (if applicable), distribution channel, and/or any other desired information.

Subsequent to providing the data, the user presses "Next" to obtain another display of selections. At this display screen, the user selects "Fetch Customer Lists", STEP 306. The fetch customer lists request generates an MQSeries call, which is translated into a Remote Function Call into SAP, to retrieve existing customer lists from the private environment. Each customer list includes a list of customers within an enterprise. An enterprise can have many legal entities or physical locations (e.g., plants, distribution centers, headquarters . . . ), and each of those has a different customer number in the customer master database of the contractor, even if it is part of the same enterprise.

The result of the fetch customer lists request is stored in the local web server DB2 database for local processing. After fetching the customer lists, the desired customer list is selected therefrom and retrieved from the local DB2 database, STEP 308. This customer list includes one or more customers to be part of the contract (e.g., the sites of Company A in a selected geographic region).

Thereafter, a sold-to party (i.e., the customer to sign the proposal) is selected for the contract proposal, STEP 310. For example, the sold-to party is selected from a list of potential sold-to parties or the appropriate sold-to party is entered. Additionally, all the customers from the customer list for which inventory should be retrieved from the SAP are selected, STEP 312.

Next, the desired partner functions are selected, STEP 314. The partner functions include, for instance, the parties associated with the proposal, such as the sold-to party, the bill-to party (i.e., the customer that will receive the invoice), the payer (i.e., the customer that will pay the invoice), and the ship-to party (i.e., the customer that will receive the goods). In one example, the customer is the same in each instance, but in some cases, this is not true. For example, in a large organization, the sold-to party is Company A at location W, the bill-to party is Company A (or a subsidiary thereof) at location X, the payer is Company A (or a subsidiary thereof) at location Y, and the ship-to party is Company A (or a subsidiary thereof) at location Z.

After the appropriate information is provided, the proposal is saved, STEP 316. In particular, the contract header information is stored on the local DB2 database. Subsequently, the user fetches the inventory for the specified customers, STEP 318. This inventory (e.g., licenses) is used as a basis for negotiating the proposal between the user (customer) and the contractor.

Figure 3C:
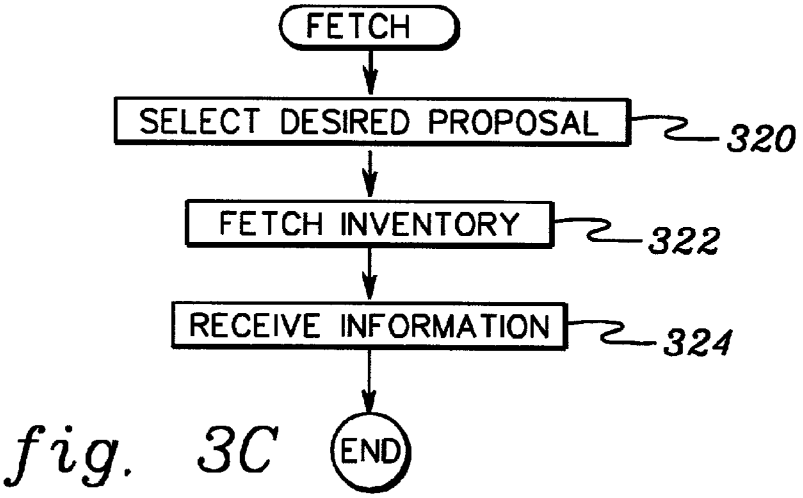
FIG. 3*c* depicts one embodiment of the logic associated with fetching inventory from a private electronic environment for the proposal of FIG. 3*a*, in accordance with an aspect of the present invention.

One embodiment of the logic associated with fetching inventory is described with reference to FIG. 3*c*. At the main menu, the user selects "Proposal Maintenance," which produces a list of all the proposals for all the customers displayed. From this list, the desired proposal name (hypertext) for a specific customer is selected, STEP 320.

Thereafter, the fetch inventory icon is selected, which generates an MQSeries call, which is translated to a Remote Function Call (RFC) into SAP, to retrieve the inventory for the selected customers, STEP 322. The inventory includes, for instance, a listing of the licenses/machines, etc., for the selected customer(s). The result of this action is stored on the local DB2 database, and a proposal detail screen is provided, STEP 324. This concludes fetching the inventory from SAP.

After fetching the inventory, all the information needed for the proposal document has been entered. At this time and/or during the entering phase, negotiations take place between the contractor and the customer. These negotiations and the filling in of the data are handled at the front-end, while disconnected from the back-end. The front-end only connects to the back-end, when data is desired from the back-end. Other than that, the proposal is created off-line. This enables the proposal to be created in a user-friendly environment using the already known tools of the web. Also, it allows the proposal to be created, for the most part, off-line from the private server. This reduces the delays inherent in synchronous connections.

In the above example, it is assumed that the proposal is created for an enterprise. However, this is not necessary. If the proposal is to be created for a single customer, instead of selecting the customer from a list, the desired customer can be entered on the screen.

Figure 4:
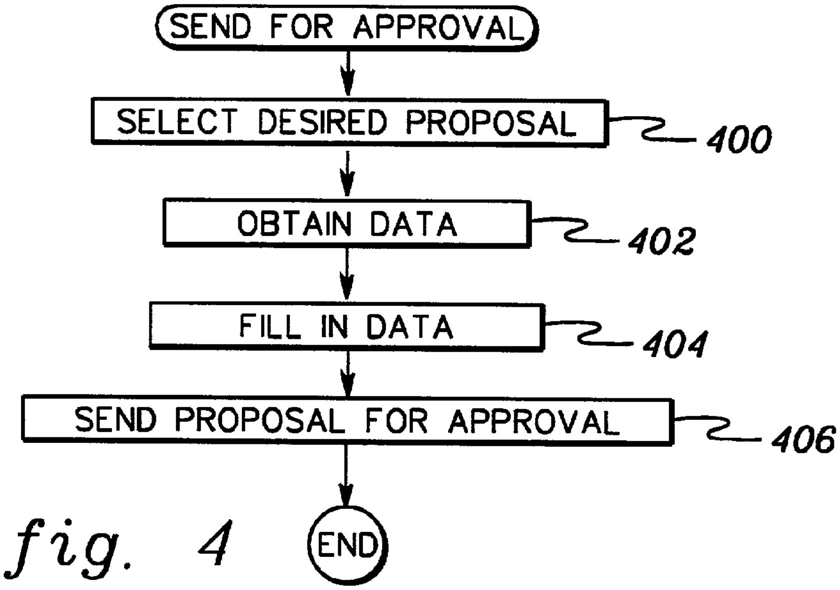
FIG. 4 depicts one embodiment of the logic associated with requesting approval of the proposal of FIG. 3*a*, in accordance with an aspect of the present invention.
Figure 5:
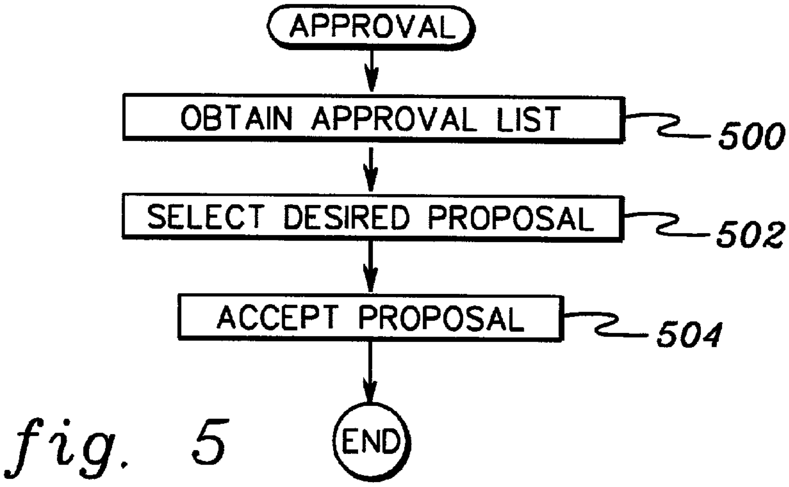
FIG. 5 depicts one embodiment of the logic associated with approving the proposal of FIG. 3*a* for contract, in accordance with an aspect of the present invention.

With a further feature of the present invention, after the proposal has been created, it is forwarded to an approver for approval. In one embodiment, the approver is a supervisor that has the final say as to whether the proposal is acceptable to the contractor. One embodiment of the logic associated with sending the proposal for approval is described with reference to FIG. 4.

In one example, the user selects "Proposal Maintenance" on a main menu of the web server to obtain a list of proposals for the customers. Then, the user clicks on the desired proposal name for a specific customer in order to select the desired proposal to be approved, STEP 400. Thereafter, various data is obtained from the back-end system to ensure the proposal has up-to-date information, STEP 402. For instance, the inventory list for the customer is re-fetched from the SAP, along with price information, to ensure the latest information is included in the proposal.

Subsequently, a registration screen is obtained, which requests certain information, such as the identification of the approver and the e-mail address of the approver, STEP 404. After providing this information, the user sends the proposal to the supervisor for approval, STEP 406. In one example, this is performed using a standard e-mail protocol.

In due course, an approver logs into the web server and checks to see if there are any proposals for approval. That is, the approver checks its e-mail messages to determine if there are any proposals to be approved. If there are, the approver clicks on a list of proposals for approval, STEP 500, and selects the desired proposal from the list, STEP 502. If the approver is satisfied with the proposal, the approver accepts the proposal for contract registration, STEP 504. For example, the approver clicks on "Accept", which generates an MQSeries call. The call is translated into a SAP RFC call to register the contract. The MQSeries call includes the contract data to be transferred from the web server to the SAP. This concludes the approval process.

Figure 6:
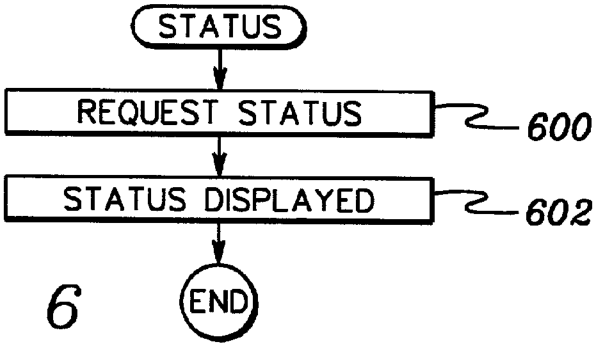
FIG. 6 depicts one embodiment of the logic associated with obtaining status regarding the proposal of FIG. 3*a*, in accordance with an aspect of the present invention.

It is possible to check on the status of the proposal through a "Proposal Maintenance" option on the main menu. In order to check on the proposal status, the desired proposal is selected with a check proposal status option by using a check box, STEP 600 (FIG. 6). By clicking on status, the status request is sent to the SAP via MQSeries. The SAP returns the status, which is displayed, STEP 602. Further, the local DB2 database is updated with the new status.

In addition to the above, another feature of the invention includes maintaining the proposal locally on the web server, which is described with reference to FIG. 7. The proposal maintenance function enables the user to modify an existing proposal (i.e., before it becomes a contract). As one example, the proposal is modified as a result of negotiations.

Figure 7:
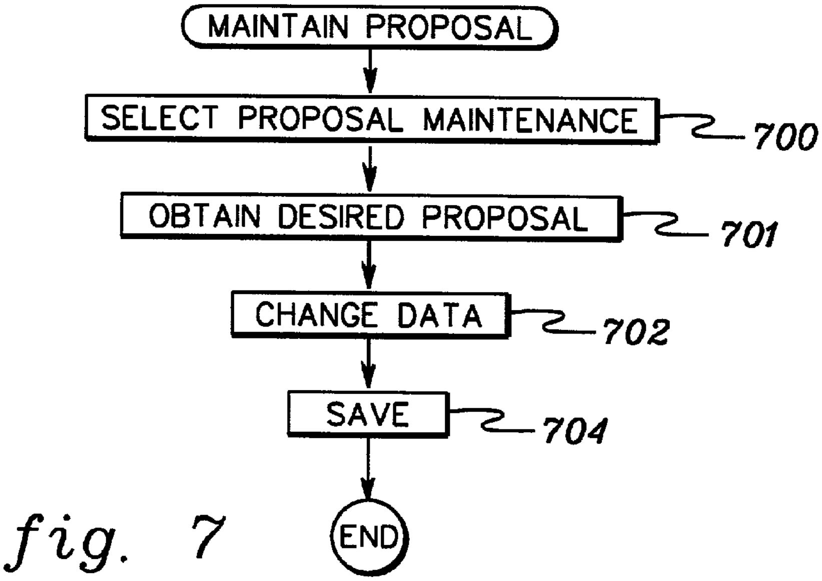
FIG. 7 depicts one embodiment of the logic associated with maintaining a proposal, in accordance with an aspect of the present invention.

Referring to FIG. 7, initially the user selects "Proposal Maintenance" on the main menu, and is thus, provided with a list of proposals, STEP 700. From that list, the user selects the desired proposal name, STEP 701, which causes one or more screens to be displayed. These screens are similar to the screens used to create the proposal.

Thereafter, the user clicks on change proposal and changes any desired data, STEP 702. After the desired data is changed, the user saves the changed data, STEP 704.

Figure 8:
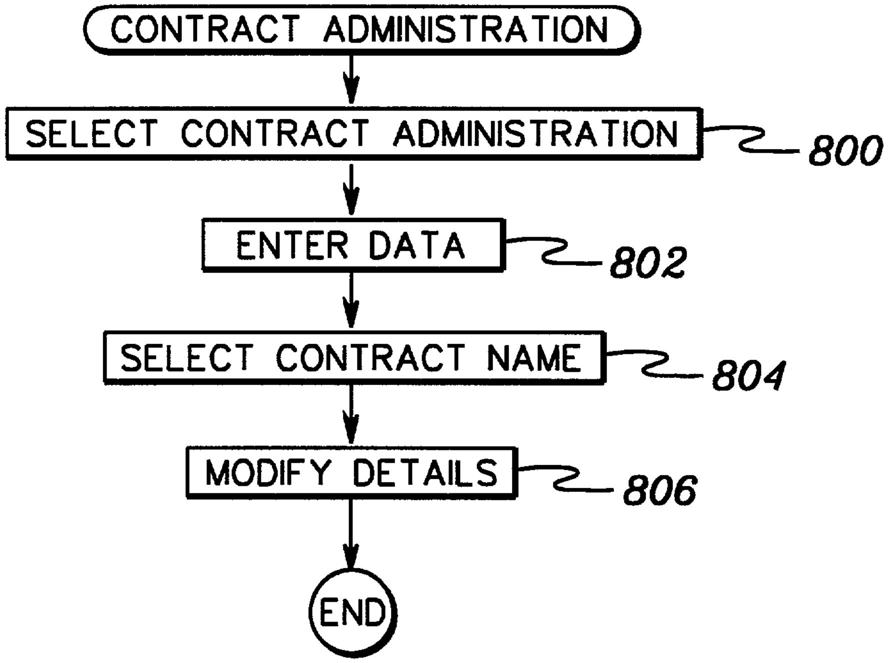
FIG. 8 depicts one embodiment of the logic associated with administering a contract, in accordance with an aspect of the present invention.
Figure 9:
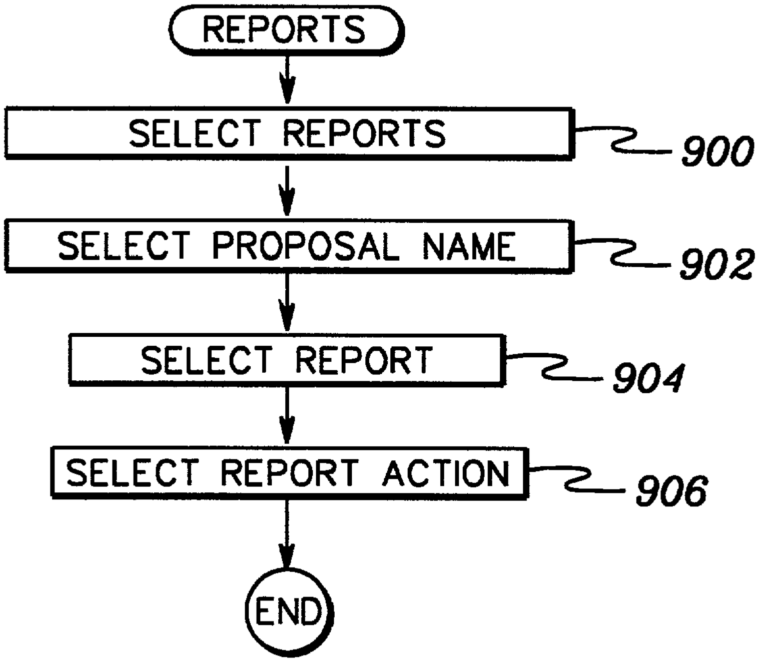
FIG. 9 depicts one embodiment of the logic associated with obtaining reports, in accordance with an aspect of the present invention.

Typically, once a proposal has been finalized, submitted, and subsequently registered as a contract, the contract is administered in the back-end system. This includes billing the contract and other types of functions, which do not require intervention by the user/contract administrator. However, in some circumstances, the contract may have to be changed in the back-end system. Thus, a feature of the present invention enables changes to contracts already registered with the back-end system. These changes are invoked as requests to the back-end system to perform the appropriate contract change action. Examples of functions that may be performed include contract amendment, contract extension, contract renewal, contract replacement and contract cancellation. One embodiment of logic associated with administering a contract by a user on the web server is described with reference to FIG. 8.

Initially, "Contract Administration" is selected from the main menu, STEP 800. Then, selected data is entered including, for instance, an optional selection date used to select contracts valid in a certain date range. Then, the desired contract name is selected from a list of contract names, STEP 804. Thereafter, details associated with the selected contract name are modified, STEP 806. For example, details may be modified to reflect the current customer inventory. This may include, for instance, re-fetching inventory from the SAP, adding additional planning items, and/or altering dates on existing line items.

In addition to the above, various reports may be requested. These reports may be viewed on-line, printed and/or downloaded to Lotus 1-2-3 Spreadsheets. As examples, the reports may include a control report, which validates users involved in the proposal creation, submission, and approval; variance reports; contract attachment reports; cash flow reports; account planning reports; discounted cash flow reports; and amendment contract reports.

In one embodiment, to request a report, the user selects the "Reports" action on the main menu, STEP 900, and then selects a desired proposal name from a drop down list, STEP 902. Thereafter, the user selects the desired report, STEP 904, and then chooses whether to view, download and/or save the report, STEP 906. This concludes the reporting function on the web server.

Described in detail above is a capability that enables one or more aspects of managing information to be performed within a public electronic environment, rather than within a private electronic environment. This enables an asynchronous connection to be used when performing the various aspects, and allows users to utilize a user-friendly environment.

In accordance with a feature of the present invention, an end-to-end solution for recurring charge proposal, pricing and contract administration (contract management, billing, revenue recognition) is provided for various types of agreements. Proposals are created at the front-end server, and then, once finalized, are forwarded to the back-end server to create the contract. Once created, the contract is administered in the back-end server, except for various functions or requests that can be performed by the user at the front-end. The back-end system uses a set of indexed tables to maintain the data employed by the various proposals/contracts.

In summary, the front-end web server performs the following functions, as one example:

1) Contract Proposal:
   - Retrieve base inventory list;
   - Retrieve planned inventory list;
   - Calculate contract price and growth figures;
   - Manual planning (copy/paste items-price alteration);
   - Prepare/supplement reports.
2) Contract Creation:
   - Submit to back-end.
3) Contract Administration:
   - Submit changes to back-end;
     - Amendment;
     - Extension;
     - Replacement;
     - Cancellation.

At the back-end, the following functions are performed, as one example:

1) Base Maintenance:
   - Sales order processing;
   - Configuration/entitled price;
   - Quotation pricing (planned inventory).
2) Contract Proposal:
   - Retrieve/transmit base inventory;
   - Retrieve/transmit planned inventory.
3) Contract Creation:
   - Create contract;
   - Suppress billing.
4) Contract Administration:
   - Generate billing/accounting;
   - Contract change: amendment, extension, replacement, cancellation.

Advantageously, aspects of the present invention minimize access to the back-end system by pre-fetching data from the back-end system and storing it on the web server. This data is then used to create and/or maintain proposals on the front-end system. When the proposals are complete, they are then forwarded to the back-end system for creation as a contract.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing information, said method comprising:

identifying information, via a public electronic environment, from an enterprise resource planning system within a private electronic environment;

managing the information using the public electronic environment, wherein one or more aspects of managing the information are performed within the public electronic environment off-line from the private electronic environment; and registering the managed information, via the public electronic environment, with the private electronic environment.

2. The method of claim 1, wherein the information comprises a proposal for a contract.

3. The method of claim 1, wherein said managing comprises creating the information.

4. The method of claim 3, wherein the information comprises a proposal for a contract, and the creating comprises entering data for the proposal.

5. The method of claim 4, further comprising obtaining one or more data from the private electronic environment to be used in creating the proposal.

6. The method of claim 4, wherein the creating further comprises negotiating one or more terms of the proposal, while disconnected from the private electronic environment.

7. The method of claim 1, wherein said managing comprises maintaining the information.

8. The method of claim 1, wherein said managing comprises obtaining status relating to the information.

9. The method of claim 1, wherein said managing comprises requesting approval of the information, and wherein said registering is performed in response to the approval.

10. The method of claim 1, wherein said registering is performed in real-time.

11. The method of claim 1, wherein the information comprises a proposal, and wherein the registering comprises registering the proposal with the private electronic environment to form a contract.

12. The method of claim 11, wherein the managing comprises administering the contract.

13. The method of claim 1, wherein the managing comprises obtaining a report associated with the information.

14. The method of claim 1, wherein the public electronic environment comprises a server executing a web portal.

15. The method of claim 1, further comprising pre-fetching data from said private electronic environment to be used in the managing of said information.

16. The method of claim 15, further comprising storing said data within said public electronic environment.

17. A method of managing the creation of a proposal, said method comprising:

obtaining data, via a public electronic environment, for said proposal from an enterprise resource planning system within a private electronic environment;

creating said proposal using said public electronic environment disconnected from said private electronic environment, said creating using at least a portion of the obtained data; and providing said proposal, via said public electronic environment, to said private electronic environment.

18. The method of claim 17, further comprising approving said proposal, prior to providing said proposal to said private electronic environment.

19. The method of claim 18, wherein said providing comprises registering said proposal with said private electronic environment, subsequent to said approval, wherein said proposal becomes a contract.

20. The method of claim 17, wherein said creating said proposal comprises negotiating one or more terms of said proposal.

21. The method of claim 17, wherein said public electronic environment comprises a web server.

22. The method of claim 17, wherein said private electronic environment comprises a server protected by one or more fire walls.

23. The method of claim 17, wherein said proposal comprises a proposal for a sales contract.

24. A system of managing information, said system comprising:

information obtained via a public electronic environment from an enterprise resource planning system within a private electronic environment;

means for managing the information using the public electronic environment, wherein one or more aspects of managing the information are performed within the public electronic environment off-line from the private electronic environment; and means, via the public electronic environment, for registering the managed information with the private electronic environment.

25. The system of claim 24, wherein the information comprises a proposal for a contract.

26. The system of claim 24, wherein said means for managing comprises means for creating the information.

27. The system of claim 26, wherein the information comprises a proposal for a contract, and the means for creating comprises means for entering data for the proposal.

28. The system of claim 27, further comprising means for obtaining one or more data from the private electronic environment to be used in creating the proposal.

29. The system of claim 27, wherein the means for creating further comprises means for negotiating one or more terms of the proposal, while disconnected from the private electronic environment.

30. The system of claim 24, wherein said means for managing comprises means for maintaining the information.

31. The system of claim 24, wherein said means for managing comprises means for obtaining status relating to the information.

32. The system of claim 24, wherein said means for managing comprises means for requesting approval of the information, and wherein the registering is performed in response to the approval.

33. The system of claim 24, wherein the registering is performed in real-time.

34. The system of claim 24, wherein the information comprises a proposal, and wherein the means for registering comprises means for registering the proposal with the private electronic environment to form a contract.

35. The system of claim 34, wherein the means for managing comprises means for administering the contract.

36. The system of claim 24, wherein the means for managing comprises means for obtaining a report associated with the information.

37. The system of claim 24, wherein the public electronic environment comprises a server executing a web portal.

38. The system of claim 24, further comprising means for pre-fetching data from said private electronic environment to be used in the managing of said information.

39. The system of claim 38, further comprising means for storing said data within said public electronic environment.

40. A system of managing the creation of a proposal, said system comprising:

means for obtaining data for said proposal, via a public electronic environment, from an enterprise resource planning system within a private electronic environment;

means for creating said proposal using said public electronic environment disconnected from said private electronic environment, said means for creating using at least a portion of the obtained data; and means, via said public electronic environment, for providing said proposal to said private electronic environment.

41. The system of claim 40, further comprising means for approving said proposal, prior to providing said proposal to said private electronic environment.

42. The system of claim 41, wherein said means for providing comprises means for registering said proposal with said private electronic environment, subsequent to said approval, wherein said proposal becomes a contract.

43. The system of claim 40, wherein said means for creating said proposal comprises means for negotiating one or more terms of said proposal.

44. The system of claim 40, wherein said public electronic environment comprises a web server.

45. The system of claim 40, wherein said private electronic environment comprises a server protected by one or more fire walls.

46. The system of claim 40, wherein said proposal comprises a proposal for a sales contract.

47. A system of managing information, said system comprising:

information obtained via a public electronic environment from an enterprise resource planning system within a private electronic environment;

the public electronic environment adapted to manage the information, wherein one or more aspects of managing the information are performed within the public electronic environment off-line from the private electronic environment; and the private electronic environment adapted to register the managed information from the public electronic environment.

48. A system of managing the creation of a proposal, said system comprising:

data for said proposal obtained via a public electronic environment from an enterprise resource planning system within a private electronic environment;

said public electronic environment adapted to create said proposal disconnected from said private electronic environment, said public electronic environment using at least a portion of the obtained data; and said private electronic environment adapted to receive the proposal from the public electronic environment.

49. At least one program storage device readable by a machine, tangibly embodying at least one program of instructions executable by the machine to perform a method of managing information, said method comprising:

identifying information, via a public electronic environment, from an enterprise resource planning system within a private electronic environment;

managing the information using the within a public electronic environment, wherein one or more aspects of managing the information are performed within the public electronic environment off-line from the private electronic environment; and registering, via the public electronic environment, the information with the private electronic environment.

50. The at least one program storage device of claim 49, wherein the information comprises a proposal for a contract.

51. The at least one program storage device of claim 49, wherein said managing comprises creating the information.

52. The at least one program storage device of claim 51, wherein the information comprises a proposal for a contract, and the creating comprises entering data for the proposal.

53. The at least one program storage device of claim 52, wherein said method further comprises obtaining one or more data from the private electronic environment to be used in creating the proposal.

54. The at least one program storage device of claim 52, wherein the creating further comprises negotiating one or more terms of the proposal, while disconnected from the private electronic environment.

55. The at least one program storage device of claim 49, wherein said managing comprises maintaining the information.

56. The at least one program storage device of claim 49, wherein said managing comprises obtaining status relating to the information.

57. The at least one program storage device of claim 49, wherein said managing comprises requesting approval of the information, and wherein said registering is performed in response to the approval.

58. The at least one program storage device of claim 49, wherein said registering is performed in real-time.

59. The at least one program storage device of claim 49, wherein the information comprises a proposal, and wherein the registering comprises registering the proposal with the private electronic environment to form a contract.

60. The at least one program storage device of claim 59, wherein the managing comprises administering the contract.

61. The at least one program storage device of claim 49, wherein the managing comprises obtaining a report associated with the information.

62. The at least one program storage device of claim 49, wherein the public electronic environment comprises a server executing a web portal.

63. The at least one program storage device of claim 49, wherein said method further comprises pre-fetching data from said private electronic environment to be used in the managing of said information.

64. The at least one program storage device of claim 63, wherein said method further comprises storing said data within said public electronic environment.

65. An article of manufacture, comprising:

at least one computer usable medium having computer readable program code means embodied therein for causing the managing of the creation of a proposal, the computer readable program code means in said article of manufacture comprising:

computer readable program code means for causing a computer to obtain data for said proposal, via a public electronic environment, from an enterprise resource planning system within a private electronic environment;

computer readable program code means for causing a computer to create said proposal using said a public electronic environment disconnected from said private electronic environment, said computer readable program code means for causing a computer to create using at least a portion of the obtained data; and computer readable program code means for causing a computer to provide said proposal, via said public electronic environment, to said private electronic environment.

66. The article of manufacture of claim 65, further comprising computer readable program code means for causing a computer to approve said proposal, prior to providing said proposal to said private electronic environment.

67. The article of manufacture of claim 66, wherein said computer readable program code means for causing a computer to provide comprises computer readable program code means for causing a computer to register said proposal with said private electronic environment, subsequent to said approval, wherein said proposal becomes a contract.

68. The article of manufacture of claim 65, wherein said public electronic environment comprises a web server.

69. The article of manufacture of claim 65, wherein said private electronic environment comprises a server protected by one or more fire walls.

70. The article of manufacture of claim 65, wherein said proposal comprises a proposal for a sales contract.

* * * * *